United States Patent [19]
Koch

[11] Patent Number: 5,785,010
[45] Date of Patent: Jul. 28, 1998

[54] COLLAR FOR HOLDING AND LEADING ANIMALS

[76] Inventor: Heinrich Koch, Robert-Bosch-Strasse 9, 86899 Landsberg am Lech, Germany

[21] Appl. No.: 788,297

[22] Filed: Jan. 24, 1997

[30] Foreign Application Priority Data

Aug. 1, 1994 [DE] Germany .................. 9412361 U
Jul. 31, 1995 [WO] WIPO ................ PCT/EP95/03050

[51] Int. Cl.$^6$ ...................................... A62B 33/00
[52] U.S. Cl. ................................. 119/863; 119/864
[58] Field of Search ........................ 119/863, 864, 119/865

[56] References Cited

U.S. PATENT DOCUMENTS

| | | | |
|---|---|---|---|
| 4,376,366 | 3/1983 | Miller | 119/865 X |
| 4,811,695 | 3/1989 | Higgins | 119/863 X |
| 4,917,049 | 4/1990 | Peterson | 119/865 X |
| 5,383,426 | 1/1995 | Krauss | 119/864 X |

*Primary Examiner*—Nicholas D. Lucchesi
*Attorney, Agent, or Firm*—Laubscher & Laubscher

[57] ABSTRACT

A collar for holding and leading animals comprising a strap, a quick-locking clasp for putting the strap on and for taking it off, and a fastener for attaching a lead or a chain. The collar is especially characterized by the features that the strap is fixedly connected so as to form an endless strap, the quick-locking clasp being provided parallel to a strap section to be bridged for the purpose of bridging said strap section and for adjusting a predetermined length of said strap.

10 Claims, 2 Drawing Sheets

COLLAR FOR HOLDING AND LEADING ANIMALS

BACKGROUND OF THE INVENTION

The present invention refers to a collar for holding and leading animals, especially dogs, comprising a strap, a quick-locking clasp for putting the strap on and for taking it off, and a fastening means for fastening a lead or a chain.

DE 39 25 548 C2 shows a collar including a quick-locking clasp in addition to a ring used for attaching a lead thereto, said quick-locking clasp serving to close and open the collar so that it can be put on and taken off.

A collar of this type entails, however, the risk that the quick-locking clasp will burst open, if the animal pulls excessively strong at its lead or chain, as is frequently the case especially when the animals are very big. In addition, it may happen that the quick-locking clasp is opened by the animal itself, when the animal presses the quick-locking clasp against an obstacle, e.g. upon squeezing its head through said obstacle.

SUMMARY OF THE INVENTION

It is therefore the object of the present invention to improve a collar of the type mentioned at the beginning in such a way that, even if the quick-locking clasp bursts open, the collar will reliably enclose the animals neck and guarantee that the animal can be held and led more safely.

In the case of a collar of the type mentioned at the beginning, the present invention achieves this object by the features that the strap is fixedly connected so as to form an endless strap, the quick-locking clasp being provided parallel to a strap section to be bridged for the purpose of bridging said strap section and for adjusting a predetermined length of said strap.

A particularly important property of the collar according to the present invention is that, even if the quick-locking clasp bursts open under excessively high loads, the collar will not be opened completely and the animal will be prevented from escaping because the strap is connected so as to form an endless strap.

By means of the quick-locking clasp, which extends parallel to the strap section to be bridged, the collar can, when said quick-locking clasp is open, rapidly and easily be slid over the animal's head in a wider adjustment used for putting the collar on, whereupon said quick-locking clasp will have to be closed so as to fix the collar in a tight-fitting adjustment on the animal's neck.

In accordance with an advantageous embodiment of the present invention, the length of the strap can be adjusted so that the collar is adjustable to various sizes. Hence, the collar need not be produced in different sizes so that it will fit various breeeds and sizes of dogs.

In accordance with a preferred embodiment, a clamping buckle is provided for adjusting the length of the strap, a first end of said strap being conducted in a loop through said clamping buckle and through a connecting member and secured to said clamping buckle, whereas the second end of said strap is secured to said connecting member. By means of said clamping buckle, the strap can steplessly be adjusted over a large range, whereby the collar can be adjusted very precisely to the animal's neck. In addition, the clamping buckle offers the advantage that neither holes nor eyelets have to be provided in the strap.

In accordance with one embodiment of the present invention, said first end is wound in an advantageous manner around a buckle web of said clamping buckle and fixedly connected to an inner strap section on the opposite side of said buckle web in such a way that said first end of the strap is enclosed between said inner strap section and an outer strap section. This prevents the animal from rubbing itself sore on said strap end and from getting get caught on an obstacle through said strap end. In addition, the strap end is prevented from fraying.

One advantagous embodiment of the present invention is given by the features that the quick-locking clasp is a two-piece snap-in lock which is known per se and which comprises a first lock member having at least two elastic tongues each provided with at least one hook-shaped projection, and a second lock member having an opening for receiving therein the tongues, said tongues being adapted to be inserted into said opening and to be brought into locking engagement with said second lock member. The double locking effect produced between the two lock members by means of the two tongues guarantees that the snap-in lock will more reliably be prevented from bursting open even if high forces act thereon, as is frequently the case when the collar is used for big animals. In addition, it is advantageous that two forces acting in opposite directions are required for opening the snap-in lock by compressing the two tongues so that the lock will not burst open when it is pressed against an obstacle on one side thereof by the animal.

According to a further particularly advantageous embodiment of the present invention, the strap is folded into three loops at the second end thereof and superimposed strap sections are fixedly interconnected, in such a way that three loops are formed, the ring used for attaching thereto the lead being received in a first loop, the connecting member being received in a second loop and a lock member of the snap-in lock being received in a third loop. This configuration of the loops of the strap permits the strap to be constructed as an integral member and it permits the three loops to be produced by only one seam or location of connection, said three loops being used for receiving therein the ring, the connecting member and a lock member.

The second end of the strap is preferably enclosed between the superimposed strap sections so that the animal cannot rub itself sore on said strap end and so that fraying of the strap is avoided.

Another advantageous embodiment of the present invention is to be seen in the features that a second lock member of the snap-in lock is received in a fourth loop of the strap between the strap section to be bridged and the clamping buckle.

In accordance with one embodiment of the present invention, a clamping ring is provided in an advantageous manner for guiding the strap section to be bridged, the strap being guided such that it extends through the clamping ring, around the web of the lock member and back through said clamping ring. By means of this arrangement, it is, on the hand, possible to tighten, in the closed condition of the quick-locking clasp, the strap section to be bridged so that said strap section will not form any loops which may hurt the animal, and, on the other hand, the clamping ring prevents, at least for a certain period of time, the collar from changing its tight-fitting adjustment and from widening when the quick-locking clasp bursts open.

Another advantageous embodiment of the present invention is to be seen in the fact that a tightening ring is provided between said clamping buckle and said connecting member. The strap, which is twofold in this area, is held together by said tightening ring and a displacement of the connecting member is prevented.

BRIEF DESCRIPTION OF THE DRAWINGS

In the following, the present invention will be explained in detail on the basis of a preferred embodiment and the associated drawings, in which.

DETAILED DESCRIPTION

Figure 1:
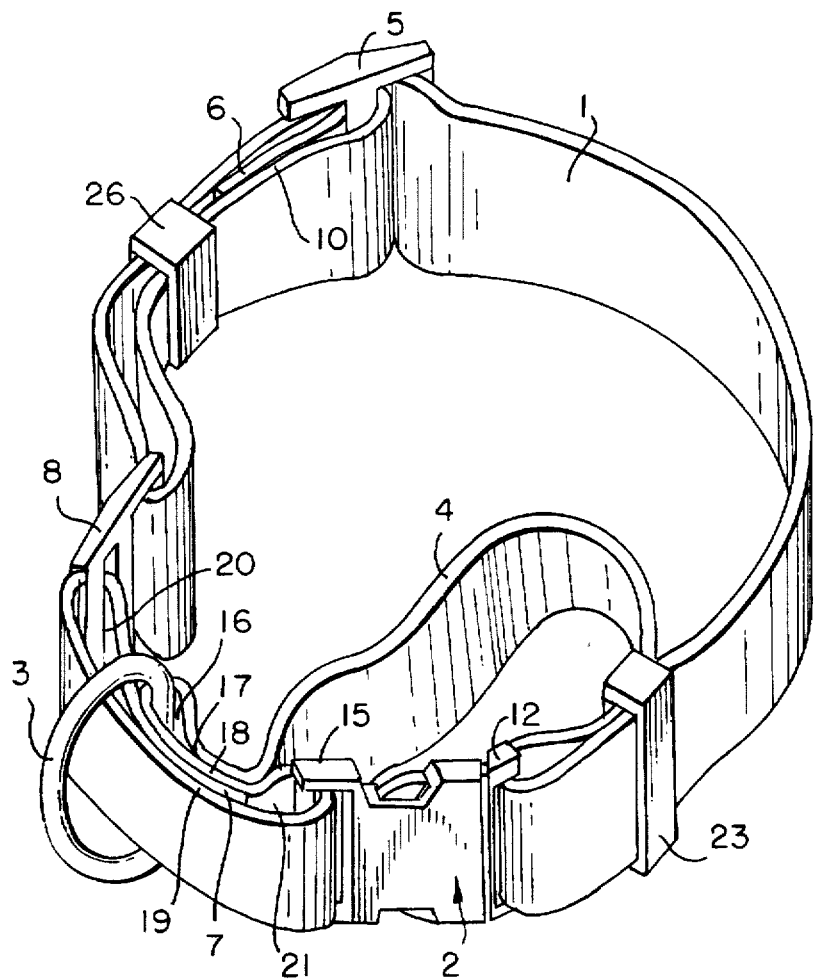
FIG. 1 shows a perspective view of a collar which is shown in its closed condition and which is provided with a quick-locking clasp arranged parallel to a strap section to be bridged, according to one embodiment of the present invention.

FIG. 1 shows a preferred embodiment of a collar according to the present invention, said collar comprising a strap 1 having secured thereto a ring 3, which is used for attaching a lead or a chain, and a quick-locking clasp 2.

The strap 1 is a woven textile strap which is very pliable although it has a high resistance to tearing. Woven textile is, however, not the only material that can be used, but other materials, such as leather, can be used as well.

The strap 1 consists of one piece and is connected such that an endless strap is formed. Thanks to the skilful manner in which the strap extends around and through the elements in question, three seams, in total, suffice to fasten the ring 3 and the quick-locking clasp 2 as well as other components of the collar which will be described hereinbelow.

Figure 3:
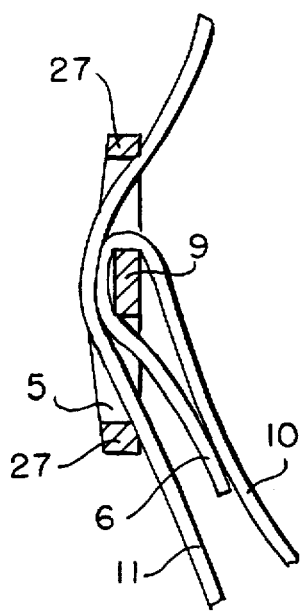
FIG. 3 shows a top view of a clamping buckle used for adjusting the length of the strap and of the manner in which the strap is guided through said clamping buckle, in a sectional view according to the embodiment shown in FIG. 1.

For adjusting the length of the strap 1, a clamping buckle 5 is provided, which, as can be seen in FIG. 3, has a central buckle web 9 and two lateral webs 27, the strap 1 extending around the central buckle web 9 and passing between the two outer buckle webs 27. A first end 6 of the strap 1 is conducted from the clamping buckle 5 through a connecting member 8 and back to the clamping buckle 5 where said first end 6 is secured in position.

Said first end 6 of the strap 1 is wound around the buckle web 9 and fixedly sewn onto an inner strap section 10 on the opposite side of the buckle web 9.

Attention should be paid to the fact that said first end 6 can be fixedly connected to the inner strap section 10 not only by sewing but also by glueing, welding or by means of similar measures.

The first end 6 of the strap 1 is wound around the buckle web 9 in such a way that said first end 6 is enclosed between the inner strap section 10 and an outer strap section 11 so that the animal can neither rub itself sore on said first end 6 nor get caught on an obstacle through said first end 6. In addition, the strap end 6 is prevented from fraying.

In order to adjust the length of the strap 1, the outer strap section 11 is adapted to be pushed or pulled through the clamping buckle 5, whereby the length of the strap section between the clamping buckle 5 and the connecting member 8 will change. This permits a stepless and very simple adjustment of the length of the collar.

As can be seen in FIG. 1, the strap 1 is connected to a first lock member 12 of the quick-locking clasp 2 on the side extending away from the other side of the clamping buckle. Following this, the strap is connected to a second lock member 15 of the two-piece quick-locking clasp 2, to the ring 3 used for fixing a lead, and to the connecting member 8.

Via said connecting member 8, the strap 1 is connected so as to define an endless strap; in the closed condition of the quick-locking clasp 2, a safety strap section 4 is bridged by the fastening of the two lock members 12 and 15 to the strap 1.

For putting on the collar, the quick-locking clasp 2 has to be opened so that the collar can be slid over the animal's head in a wider and longer adjustment. By closing the quick-locking clasp 2, the strap section 4 is bridged and the collar is shortened to a predetermined length which brings said collar into close contact with the animal's neck. Making use of the quick-locking clasp 2, the collar can be put around the animal's neck in a simple manner. Due to the fact that the strap 1 is fixedly connected so as to form an endless strap, an animal cannot even escape from said collar if the quick-locking clasp 2 should burst open, since, in this case, the strap section 4 will hold the collar together and fix it to the animal's neck.

Figure 4:
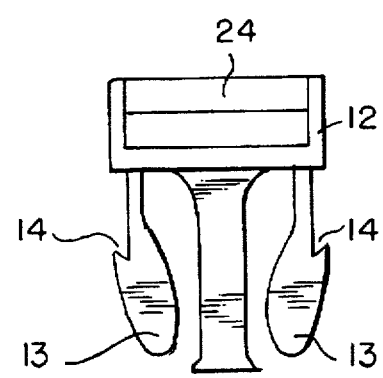
FIG. 4 shows a top view of a two-piece snap-in lock which is known per se, said snap-in lock being shown in its open condition in a fragmentary sectional view according to the embodiment of the present invention shown in FIG. 1.
Figure 4:
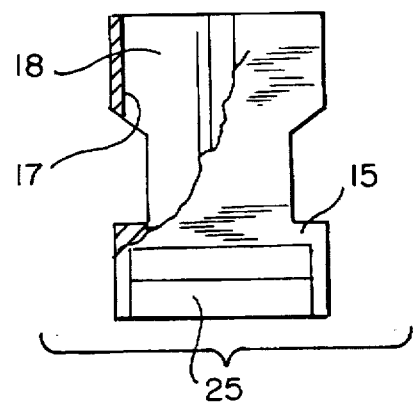

As can be seen in FIG. 4, the quick-locking clasp is a snap-in lock 2, which is already known and which comprises a first lock member 12 and a second lock member 15. The first lock member 12 has provided thereon two elastic tongues 13 which are formed integrally therewith and which each have a hook-shaped projection 14 on one outer side thereof. The first lock member 12 and its two tongues 13 are inserted into an opening 18 of the second lock member 15, the tongues 13 being elastically compressed by the inner side of a side wall 17 of said second lock member 15. When the two lock members 12 and 15 have fully been inserted into one another, the two tongues 13 are no longer compressed by the side walls 17 of said second lock member 15, whereupon their hook-shaped projections 14 will snap in position in said second lock member 15. For opening the snap-in lock 2, the lockingly engaged tongues 13 will have to be compressed by forces acting in opposite directions so that the projections 14 come out of engagement and the tongues 13 can be removed from the opening 18.

By means of the two tongues 13, the snap-in lock 2 is prevented from bursting open with enhanced reliability because the two lock members 12 and 15 are interlocked with a double locking effect with the aid of two hook-shaped projections 14. In addition, the snap-in lock 2 can also be opened less easily by the animal itself, since the lock will not burst open when it is pressed against an obstacle on one side thereof because this will only push one of the tongues 13 out of its position of engagement.

Figure 2:
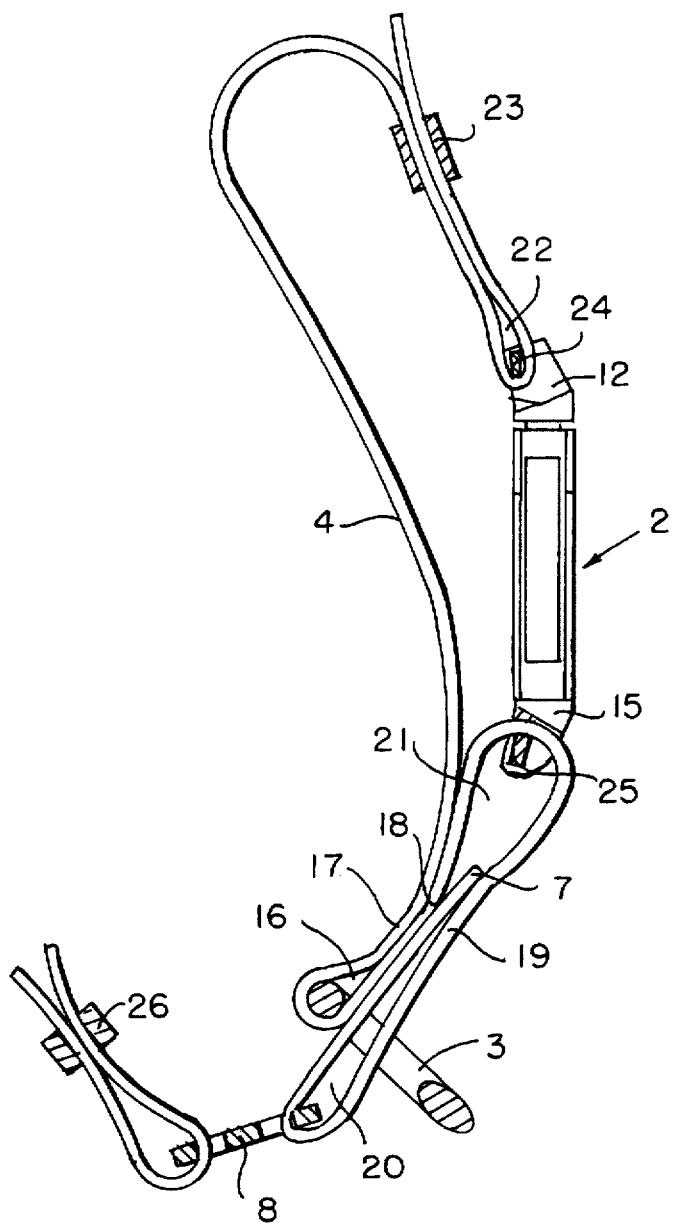
FIG. 2 shows a top view of the manner in which a strap is guided around the quick-locking clasp, in a fragmentary sectional view according to the embodiment shown in FIG. 1.

As can be seen in FIG. 2, the strap 1 is folded into three loops at the second end 7 thereof so that three loops 16, 20, 21 are formed. The superimposed strap sections 17, 18, 7 and 19 are fixedly interconnected, especially by means of sewing. The strap 1 is folded in such a way that the second end 7 of the strap 1 is enclosed between the super imposed strap sections 19 and 18 so as to prevent the animal from rubbing itself sore or so as to avoid fraying of the strap end.

A first one of the three loops 16 receives therein the ring 3, a second loop 20 receives therein the connecting member 8 and a third loop 21 receives therein the second lock member 15 with a lock web 25.

Due to the advantageous manner in which the individual loops are formed, only a single seam is necessary for fastening the three components, viz. the second lock member 15, the ring 3 used for attaching a lead thereto, and the connecting member 8. In view of the fact that the ring 3 used for attaching a lead thereto is positioned in a loop between the snap-in lock 2 and the connecting member 8, said ring 3 cannot slip along the strap 1, but is fixed in the vicinity of the snap-in lock 2 as well as in the vicinity of the connecting member 8 so that neither said snap-in lock 2 nor the connecting member 8 will hurt or rub the animal's neck, when the animal pulls at its lead, since the pull which the lead will then apply to the ring 3 will also draw the snap-in lock 2 and the connecting member 8 away from the dog's neck.

Like the second lock member 15, also the first lock member 12 of the snap-in lock 2 is received in a loop of the strap 1 by means of a web 24. The strap 1 is wound around said web 24, and opposite strap sections are fixedly interconnected so that a fourth loop 22, in which said web 24 is received, is fixed.

For tightening, in the closed condition of the snap-in lock 2, the strap section 4 to be bridged so that said strap section 4 will abut on the snap-in lock 2 and along the fourth loop 22 without any folds which may hurt the animal, a clamping ring 23 is provided for guiding the strap section 4 to be bridged. The strap 1 is conducted through the clamping ring 23, around the web 24 of the first lock member 12 and back through said clamping ring 23 so that the strap section 4 to be bridged will be tightened when the clamping ring 23 is pushed back, i.e. away from the first lock member 12. At its pushed-back position, the clamping ring 23 prevents, at least for a certain period of time, the collar from widening from its tight-fitting adjustment if the snap-in lock 2 bursts open, since such widening of the collar could only take place if the clamping ring 23 were displaced to a position adjacent the first lock member 12 against its friction and clamping forces.

Similar to said clamping ring 23, a tightening ring 26 is provided between the clamping buckle 5 and the connecting member 8, as can be seen in FIG. 1; the strap 1, which is twofold in this area, viz. the inner strap section 10 and the outer strap section 11, is conducted through this tightening ring 26, whereby the length of the strap 1 extending through the clamping buckle 5 cannot be changed inadvertently.

Due to its one-piece strap, which is connected so as to form an endless strap, the collar according to the present invention guarantees that animals can be held and led more safely because the strap cannot open completely but will always reliably abut on the animal's neck. In addition, the collar can be put on and taken off the animal's neck rapidly and very easily by means of the quick-locking clasp extending parallel to the strap section to be bridged.

What is claimed is:

1. A collar for holding and leading an animal having a head and neck, comprising:

(a) a flexible unitary strap (1) having first and second end portions (6, 7);

(b) means including adjustable-length means (5, 8) for connecting together said strap end portions to define a circular collar of variable endless length;

(c) quick-release clasp means (2) connected with first and second intermediate portions of said strap intermediate said end portions for temporarily reducing the size of said collar in accordance with the neck size of the animal, said quick-release clasp means being releasable to permit expansion of said collar to a size for receiving the head of the animal;

(d) said strap including a safety strap portion (4) bridging said first and second intermediate portions to maintain said collar around the neck of the animal in the event of inadvertent release of said quick-release clasp means; and (e) fastening means (3) connected with said collar for fastening a lead thereto.

2. A collar as defined in claim 1, wherein said adjustable-length means includes a clamping buckle (5) and a connecting member (8) each containing a pair of parallel apertures defining therebetween a center web portion, said first strap end portion (6) being secured to said buckle center web portion and being looped to define a length adjustment loop that passes successively through a first one of said connecting member apertures and back through both of said clamping buckle apertures.

3. A collar as defined in claim 2, wherein said first strap end (6) includes a terminal portion that is looped over said clamping buckle center web portion and terminates intermediate said strap first end portion and said length adjustment loop.

4. A collar as defined in claim 2, wherein said strap (1) second end portion is folded into three loops (16, 20, 21), a first loop (16) being connected with said fastening means (3), a second loop (20) passing through one of said connecting member apertures, and a third loop (21) being connected with said second locking member of said quick-release clasp means (2).

5. A collar as defined in claim 4, wherein said second strap end (7) includes a terminal loop portion that is looped through another one of said connecting member (8) apertures and terminates intermediate said second strap end portion and said third loop (21).

6. A collar as defined in claim 4, wherein said strap is folded into a fourth loop (22) which is connected with said first locking member of said quick-release clasp means (2).

7. A collar as defined in claim 6, further including a clamping ring (23) slidably mounted on said strap (1) and cooperating with said fourth loop to remove excess length in said parallel safety strap portion (4).

8. A collar as defined in claim 2, further comprising a tightening ring (26) slidably mounted on said strap (1) on said length adjustment loop between said connecting member (8) and said clamping buckle (5) for securing both sides of said length adjustment loop together.

9. A collar as defined in claim 1, wherein said quick-release clasp means (2) comprises two-piece snap-in lock means including a first locking member (12) having at least two elastic tongues (13) each including at least one hook-shaped projection (14), and a second locking member (15) containing an opening (18) for receiving said tongues and for holding said tongues in locking engagement therewith.

10. A collar as defined in claim 1, wherein said fastening means (3) comprises a ring receiving at least one loop formed in said strap second end portion.

* * * * *